United States Patent
Alich

[11] 3,902,114
[45] Aug. 26, 1975

[54] METHOD OF AND APPARATUS FOR MEASURING THE DISTANCE BETWEEN COOPERATING ROLLERS OF A ROLLING MILL

[76] Inventor: Günther Alich, Zelgstrasse 160, 8134 Adliswil, Switzerland

[22] Filed: June 18, 1973

[21] Appl. No.: 370,822

Related U.S. Application Data

[63] Continuation-in-part of Ser. No. 67,386, Aug. 27, 1970, abandoned, which is a continuation-in-part of Ser. No. 769,258, Oct. 21, 1968, abandoned.

[30] Foreign Application Priority Data
Oct. 20, 1967 Germany.......................... 1623127

[52] U.S. Cl...................... 324/34 D; 72/21; 72/35; 324/34 TK
[51] Int. Cl............................................ G01r 33/00
[58] Field of Search ............ 324/34 R, 34 D, 34 PS, 324/34 TK; 72/21, 35

[56] References Cited
UNITED STATES PATENTS
3,419,798   12/1968   Walton ............................ 324/34 D
3,662,576   5/1972   Girlatschek..................... 324/34 TK FOREIGN PATENTS OR APPLICATIONS
121,961   1/1959   U.S.S.R............................ 324/34 D Primary Examiner—Robert J. Corcoran
Attorney, Agent, or Firm—Werner W. Kleeman

[57] ABSTRACT

A method of, and apparatus for, the contactless measuring of the distance between cooperating rolls i.e. the roller gap of a rolling mill and thereby determining the thickness of processed sheet-like stock, such as metal or plastic foils, which contemplates directly mounting at least one measuring probe at the region of the cooperating rolls, continuously monitoring the change in the spacing between the lengthwise axes of the cooperating rolls by the measuring probe to thereby determine the size of the roller gap and in turn the thickness of the sheet-like stock processed between such cooperating rolls at the rolling mill.

12 Claims, 15 Drawing Figures

METHOD OF AND APPARATUS FOR MEASURING THE DISTANCE BETWEEN COOPERATING ROLLERS OF A ROLLING MILL

CROSS-REFERENCE TO RELATED APPLICATION

This is a continuation-in-part application of my copending United States application Ser. No. 67,386, filed Aug. 27, 1970, now abandoned which, in turn, is a continuation-in-part of my prior copening United States application Ser. No. 769,258, filed Oct. 21, 1968, now abandoned, the disclosure of such applications being incorporated herein by reference.

BACKGROUND OF THE INVENTION

The present invention broadly relates to a new and improved method of, and apparatus for, determining a dimension with the aid of inductive fields and, in particular, is directed to a new and improved method of, and apparatus for, accurately measuring the distance between cooperating rolls or rollers, forming the roller gap of a rolling mill for sheet stock, such as metal or plastic foils.

There are already known to the art a number of different techniques and systems for the geometrical measuring of ferromagnetic bodies, in particular ascertaining the thickness of length of the body or the distance between two bodies, through the use of a feeler or alternatively through contactless scanning and while employing a magnetic field generated by direct currents or alternating currents.

The prior art is also familiar with the technique of determining the thickness of a non-ferromagnetic body, for instance a color layer, in that the object to be measured having parallel sides along with a field-dependent probe, for instance a Hall generator, are placed between two permanent magnets of known field strength, and the thickness of the measured object together with the probe thickness is mechanically measured and electrically indicated.

It is also generally known to measure the flux density and air gap of electrical machinery by means of bismuth spirals or modern semi-conductors, for instance formed of indium antimonide. Hence, according to the teaching of German petty Pat. No. 1,760,384 for the purpose of measuring the radial- or axial play of rotating machinery, the excitation of the air gap to be measured can occur by permanent magnets or electromagnets. Moreover, from this system is it known that instead of employing a single magnetic field-responsive probe there can be employed two such type probes in a bridge circuit arrangement, one probe of which is located at the measuring circuit and the other probe of which is located in a comparison circuit. Consequently, it is possible to avoid errors in the measurement result owing to temperature dependency of the probes and fluctuations in the supply current.

From the publication "Archive fur technisches Messen", publication No. V 392-4, dated August 1966, pages 175 to 178, there is taught an arrangement for the exact measurement of very small Hall voltages, as such occur for instance at low induction, and wherein two Hall generators are series connected in such a manner as to eliminate magetic remanence inductions arising by virture of null voltages and the disturbing effects brought about by thermo-electrical voltages.

These state-of-the-art systems are not considered to be suitable for the contactless electrical determination of the roller gap of a rolling mill. Although the contactless measuring of an air gap between the rotor and stator of a rotating machine, for instance as taught by the aforementioned German petty patent, is not associated with any significant difficulties because firstly the probes can be arranged at the stator and secondly the air gap is only variable within a comparatively small range and such variations need not be measured with any great accuracy, so that a resolution or tolerance in the order of about $10^{-2}$ has been considered to be totally satisfactory, this is not so when carrying out measurements of the roller gap since considerably more difficult conditions prevail. In this case there must be maintained over an extremely large measuring range a very high measuring accuracy of about 1 micron, which in terms of a standard gap thickness or width corresponds to a resolution accuracy in the order of for instanct $10^{-4}$. Apart from the disturbance factors which are associated with magnetic field-responsive probes, and which could not be elimated with the aforementioned prior art systems, during measurement of the roller gap of a rolling mill there arise different, generally dynamic disturbance factors, such as for instance the eccentricity of the rolls and the flattening of such rolls which must be determined by the measurement operation.

Attempts have already been made to solve the problem of exactly measuring the roller gap, and which constitutes the prerequisite for maintaining constant the thickness of the rolled material. For quite some time there have been employed in practice essentially two techniques, and specifically measuring the thickness of the band material behind the roller gap, that is to say, externally of the frame of the rolling mill, and secondly, measuring the forces exerted at the frame. The first technique does not satisfy the need of attaining a true measurement of the roller gap as an input magnitude for a control for the roller gap since the measurement location and the adjustment location are spatially separated from one another. On the other hand, the technique of measuring the roller forces — as would be the case for any indirect measuring technique — is associated with the disadvantage that it is impossible to determine and eliminate an entire series of disturbing magnitudes such as speed of the rolls, eccentricity of the rolls, play of the bearings, and so forth. Attempts have also been made to carry out a measurement of the roller gap by optical means by this type of equipment has, however, been found in practice to be unsuitable for operational reasonss, particularly the contamination of the roller gap and the frequent need to exchange the rolls.

SUMMARY OF THE INVENTION

Hence, it is a primary object of the present invention to provide an improved method of, and apparatus for, the contactless electrical determination of the roller gap of a rolling mill.

Another and more specific object of the present invention is directed to a new and improved method of, and apparatus for, measuring the roller gap of a rolling mill by means of a magnetic field in a manner not associated with the aforementioned drawbacks and limitations of the prior art proposals.

Still a further significant object of the present invention relates to a new and improved method of, and apparatus for, measuring the roller gap of a rolling mill, and specifically the spacing between the lengthwise axes of cooperating rollers so as to, in turn, derive a measurement of the thickness of the rolled stock, by means of an inductive field.

Yet a further significant object of the present invention is concerned with reliable and accurate measurement of the roller gap of a rolling mill by carrying out the measuring operation directly at the roller gap, and specifically by ascertaining the spacing or distance between the lengthwise axes of the cooperating rolls of the gap.

A further object of the invention relates to measuring the roller gap and in turn the thickness of rolled stock, directly at the roller gap of the rolling mill, with the aid of a magnetic field traversing a field-responsive probe so as to produce therein a Hall effect and to change the electrical conductivity thereof.

Now in order to implement these and still further objects of the invention, which will become readily apparent as the description proceeds, the method for the contactless measuring of the distance between cooperating rolls of a rolling mill, in other words the roller gap, and thereby ascertaining the thickness of the processed sheet stock, comprises the steps of directly mounting at least one measuring or test probe at the region of the cooperating rolls, continuously monitoring by means of the probe changes in the spacing between the lengthwise axes of the cooperating rolls, to thereby determine the distance between such cooperating rolls and in turn the size of the roller gap and the thickness of the sheet-like stock processed between such rolls at the rolling mill.

According to a further aspect of the invention, the potential drop across a field-responsive test probe, formed of a semi-conductor material and placed in a substantially uniform magnetic field, the intensity of which depends upon the distance to be measured, is determined and compared with a potential drop across a similar field-responsive reference probe placed in a separate magnetic field. Preferably, the test probe and the reference probe are arranged in juxtaposed branches of an electrical bridge and the magnetic field traversing the reference probe is varied until the bride is balanced so that the distance to be measured can be determined as a function of that magnetic field.

In one form of the invention, the imbalance current of the electric bridge is utilized for controlling the distance to be measured so as to adjust this distance to a desired value. This can be typically done by a conventional servocontrol to readjust the position of the rolls of the roller gap relative to one another.

The test probe may be placed in the space between two poles forming part of the magnetic circuit for the field traversing such test probe. Moreover, two test probes may be connected in series in one branch of the electrical bridge and two reference probes may be connected in series in the juxtaposed branch, the two test probes being positioned at opposite sides of and substantially equidistant from a line on which the distance measurement is effected.

The magnetic field of the test probe or probes and the magnetic field for the reference probe or probes may be produced by separate excitation coils. The excitation coils may then be connected in series and the turns of one of the coils preset to a value corresponding to a desired distance while the current passing through the exciting coil for the reference probe or probes is varied until the bridge is balanced so that the required change in current is an indication of the difference between the measured and the desired distance. Moreover, two exciting coils may be arranged opposite the two test probes and equidistant from the line on which the length measurement is effected.

As explained above, the invention is not only concerned with the aforementioned method aspects of measuring the distance between cooperating rolls of a rolling mill but also to apparatus for the performance of such method and comprises at least one test probe, and means for mounting the test probe directly at the region of the cooperating rolls of the roller gap i.e. at the roll neck in order to be able to determine changes in the distance between the lengthwise axes of such roll. There is also provided at least one reference probe, and both probes consist of similar semiconductors, the electrical conductivity of which is sensitive to the density of magnetic fields traversing such probes (e.g. Hall effect). There are also provided separate means for producing a substantially uniform magnetic field in respect of each of the probes, and means for varying the density of the magnetic field traversing the reference probe and thereby the conductivity of the latter, and an electric bridge. The test probe and the reference probe are each arranged in juxtaposed branches of the electric bridge, so that the bridge can be balanced by changing the density of the magnetic field traversing the reference probe and the distance between the rolls can be measured by such change.

A carrier of non-magnetic material may be provided for the test probe. For measuring the roller gap between the cooperating rotating rolls or roller bodies the carrier may be arranged at the region of the roller gap, typically near one or both ends or necks of the actual roller bodies performing the rolling operation and such carrier may be provided with rollers contacting cylindrical surfaces of the rolls in such a manner as to hold the carrier against displacement relative to the rolls.

The electric circuits employed for carrying out the invention are designed such and the arrangement of the probes forming part of the circuit is such that within a narrow range nonlinear characteristics of the probes which depend upon the intensity of the magnetic field and the temperature coefficients of the probes are made linear and compensated. Furthermore, elements of the measuring apparatus are mechanically fixed relative to each other so that any small displacements which may occur are compensated by differential action and the fluctuation in the measured signal due to variations of the measured distance, namely the roller gap between the rolls by accidental positional variations of such rolls, has no influence upon the measuring precision.

Moreover, in contrast to the heretofore known techniques, a knowledge of the employed field-responsive probes, such as their temperature coefficient and thickness is not required for the measuring method of the invention.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 2c portrays details of the circuit arrangement of FIG. 2a;

DETAILED DESCRIPTION OF THE PREFERRED EMBODIMENTS

Figure 1:
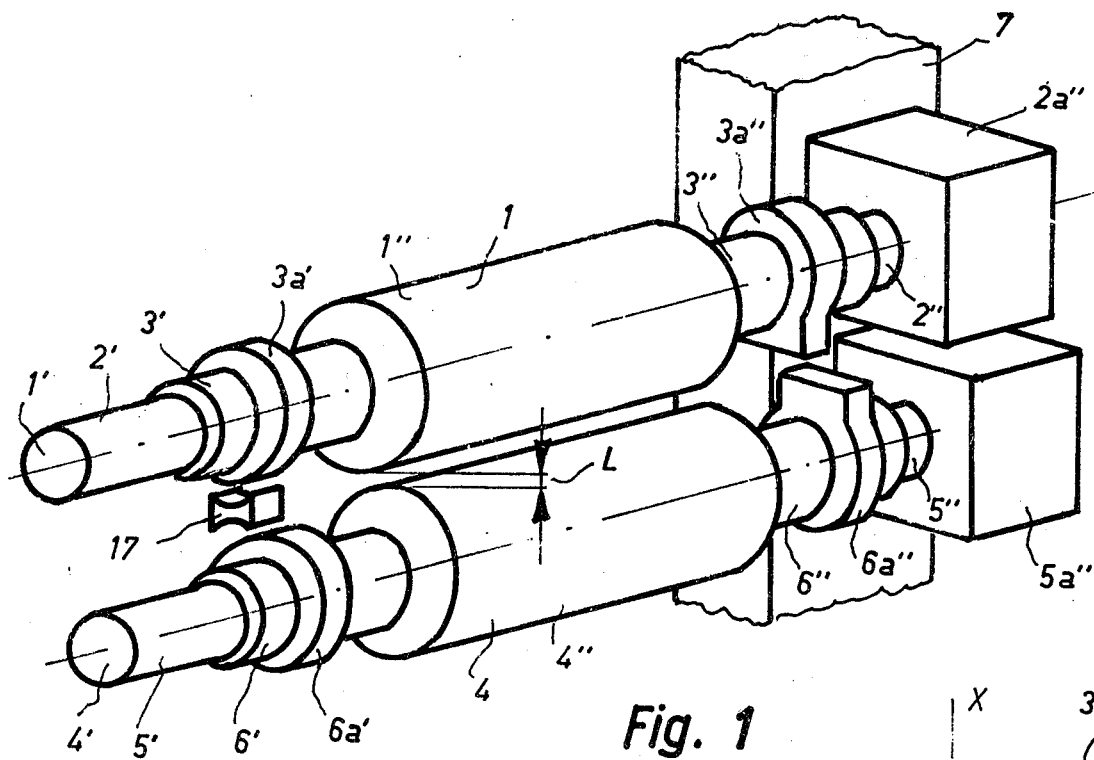
FIG. 1 is a perspective view depicting two spaced apart roller bodies or rolls, wherein there is to be measured the distance between the lengthwise axes of such rolls, in other words the roller gap.

Referring now to the drawings, in FIG. 1 there is depicted a part of a rolling mill, and showing specifically two superimposed roller bodies or rolls 1 and 4 which are spaced apart from one another in radial direction by the distance L and defining the roller gap. As illustrated in the drawings, the rollers 1 and 4 are supported on shafts 1' and 4' respectively, having roller necks or journals 2', 2'' and 5', 5'' respectively supported in suitable mounting blocks or elements, such as the mounting blocks 2a'' and 5a'' depicted for the shaft journals 2' and 5' respectively, at the right-hand side of the arrangement of FIG. 1. As a matter of convenience in illustration, the mounting blocks for the journals 2' and 5' have been conveniently omitted. Furthermore, the bearings of the shafts 1' and 4' are magnetically insulated from one another by a load-bearing frame 7 of the rolling mill. These rollers may also be supported on intermediate rings of nonmagnetic material.

Now for the purpose of measuring the spacing or distance between the lengthwise extending axes of the rollers 1 and 4, in other words the roller gap L, while considering as negligible the flattening of such rolls, there are arranged in FIG. 1 to the left and right of the rollers 1 and 4, at the roller necks two measuring arrangements which, in this case, have been shown to be different, in order to demonstrate various possibilities, but constructed according to the same basic principles. Of course the schematically depicted measuring arrangements at each end of the rollers could be the same and generally this is so in practice. Considering more particularly the measuring or measurement arrangement appearing at the left-hand side of the rollers 1 and 4, it will be recognized that such measurement arrangement embodies the sleeve members 3' and 6', the completely magnetically conductive measurement rings 3a' and 6a', and the probe carrier or support 17. By means of this measurement arrangement, and as will be explained more fully hereinafter, it is possible to measure the spacing of the measurement rings 3a' and 6a' from one another with the aid of magnetic flux supplied to the rings from the outside. This magnetic flux flows through the rings 3a' and 6a' and through the probe carrier or support 17 retained intermediate such rings without contacting the same, the probe carrier 17 being equipped with magnetic field responsive semi-conductors, as will be more fully explained hereinafter. It should be appreciated that the value of the magnetic flux in the measurement circuit and which value is determined essentially by the magnitude of the air gaps appearing at both sides between the probe carrier 17 and the respective associated measurement of measuring rings 3a' and 6a', again while considering negligible the magnetic resistance of the iron path, and with the magnetic excitation, i.e., the magnetization of the rings 3a' and 6a' constant, constitutes a measure for the size of the roller gap L.

Continuing, at the right-hand side of the arrangement of FIG. 1 there is conveniently depicted a variant embodiment of the magnetic roller gap measurement apparatus. With this embodiment the sleeves 3'' and 6'' which have been press fitted onto the roller necks or journals 2'' and 5'' respectively, serve as bearing surfaces or reference locations for the measurement rings 3a'' and 6a'' consisting of the two ring halves, as shown. The magnetic field which flows through the air gap between the measurement rings 3a'' and 6a'', with this arrangement, is generated in such measurement rings independent of components of the rolling mill, such as the rolls 1 and 4, the journals 2< and 5'' and the sleeves 3'' and 6''. Part from the negligible small stray magnetic fluxes through the rollers 1 and 4 and which are insignificant as regards the measurement operation, with this arrangement the rolling mill is not influenced by the magnetic flux.

In contrast to the magnetic rings 3a' and 6a' which are fixedly seated upon the journals 2' and 5' respectively, with the measurement arrangement appearing at the left-hand side of the rollers 1 and 4 of FIG. 1, in this case the measurement rings 3a'' and 6a'' located at the right-hand side of the showing of FIG. 1 and equipped with the excitation coils for the magnetic field and the semi-conductor probes, are mounted to be freely movable upon the guide sleeves or tracks 3'' and 6'' respectively. The measurement rings 3a'' and 6a'' are, however, stationary with regard to the mounting elements 2a'' and 5a'' and the mill frame 7.

A prerequisite for the exact measurement of the roller gap L with the measurement arrangements depicted in FIG. 1 is that the magnetic measurement rings 3a' and 6a' at the left side of the rollers 1 and 4 and the guide sleeves 3'' and 6'' at the right side of such rollers 1 and 4 are exactly centrally or concentrically ground with regard to the actual roller portions 1'' and 4'' of the rolls 1 and 4 respectively.

Figure 2E:
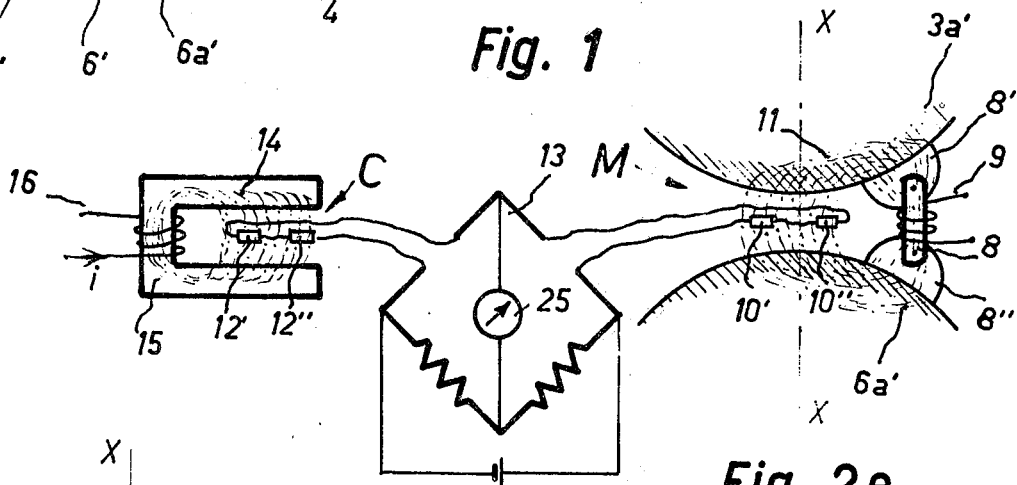
FIG 2e is a diagrammatic illustration of apparatus designed according to the teachings of the invention and incorporating two measuring circuits and a bridge circuit.
Figure 2A:
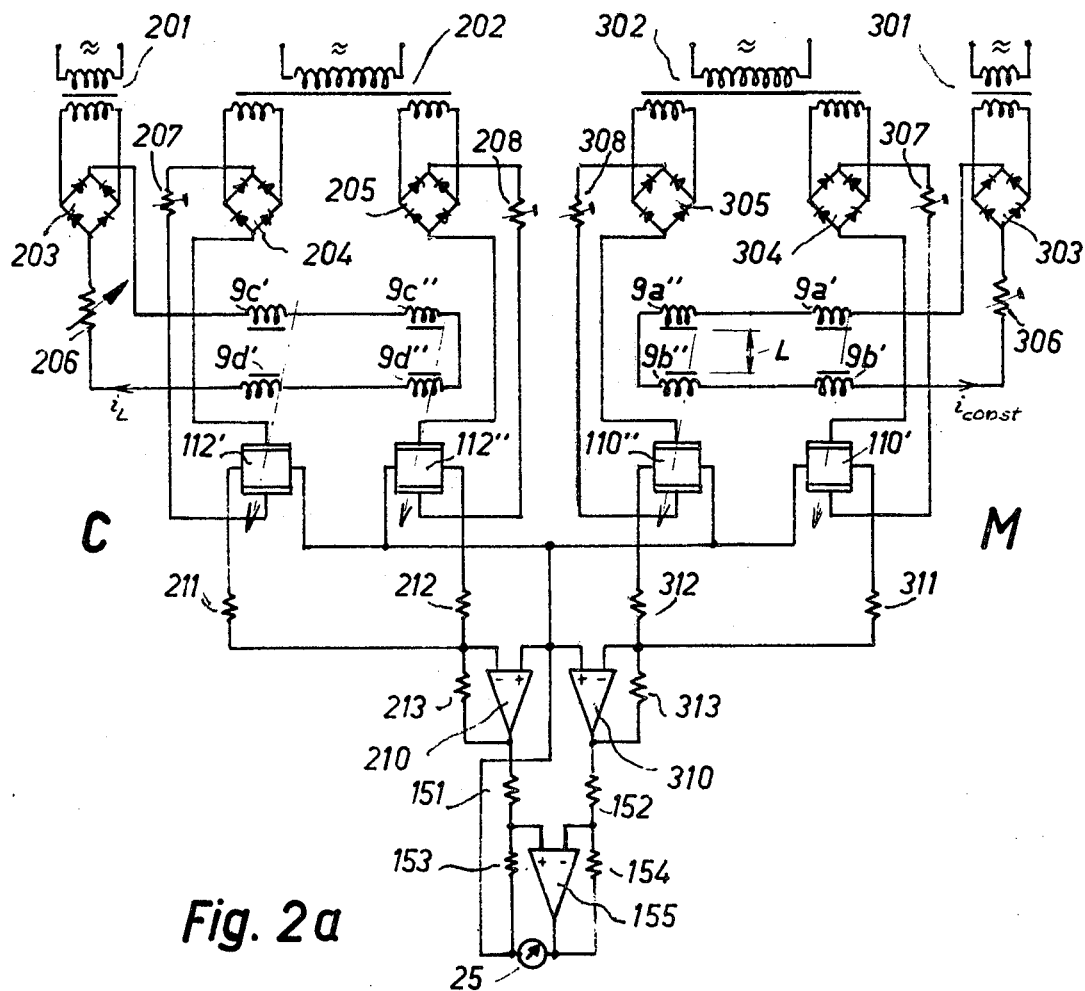
FIG. 2a is a detailed circuit diagram of measuring apparatus using Hall generators for measuring the distance between the rollers of the arrangement of FIG. 1.
Figure 2C:
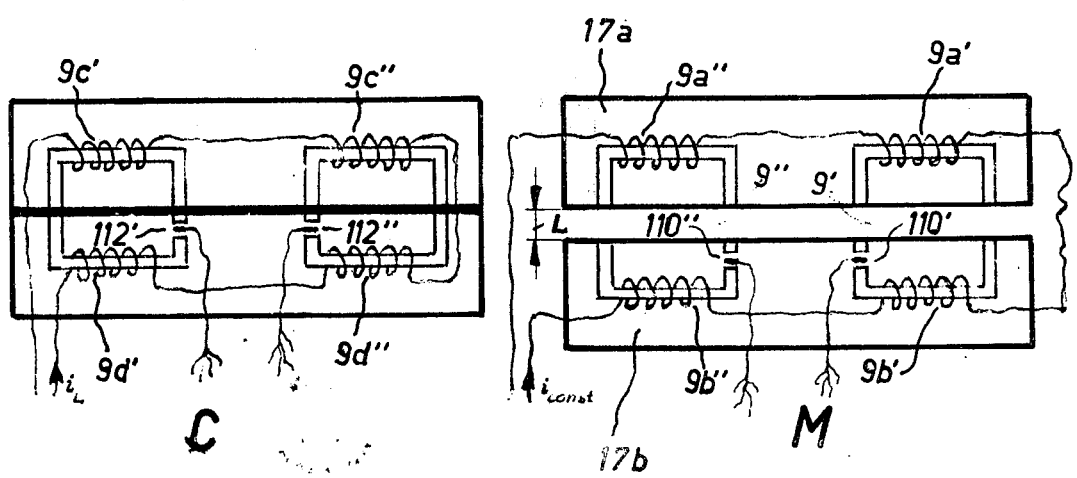

Now while keeping the foregoing in mind, there will be considered in conjunction with FIGS. 2a to 2d circuit arrangements suitable for the measurement of the roller gap L by means of the structure depicted in FIG. 1. Now in the circuit diagrams of FIGS. 2a and 2c, there is illustrated a measurement arrangement incorporating as the field-responsive semi-conductors or probes, Hall generators, the circuit diagrams of FIG. 2b and 2d portray an equivalent circuit arrangement employing as the field-responsive probes or semi-conductors field plates (magnetic field-dependent resistors). Considering therefore initially the circuit configurations of FIG. 2a and 2c in greater detail, it should be understood that the circuitry thereof consists of the electrically coupled comparison circuit C, typically accommodated at a control panel, and the actual measurement circuit M for the roller gap L, which measurement circuit M is mounted at the roller arrangement. With the symmetrically constructed measurement apparatus, as depicted in FIGS. 2a and 2c, the current supply for the comparison circuit C is provided by the transformers 201 and 202 and the associated rectifier bridges or rectifier arrangements 203 and 204, 205 respectively. The Hall currents for the probes, in other words the measurement generators 112' and 112'', in this case the Hall generators, are adjusted to appropriate values by means of the adjustable resistors 207 and 208 respectively. For the purpose of generating the magnetic field which penetrates the Hall generators 112' and 112'', apart from the transformers 201, 202 and the rectifier circuit arrangements 203, 204 and 205, there are also provided the respective pairs of coils 9c', 9d', and 9c'', 9d''.

A variabale adjustment resistor 206 is advantageously employed for the momentary desired setting or adjustment of the excitation current $i_L$ for the magnetic field which is inversely proportional to the roller gap L to be measured. The Hall voltages generated as a function of the field intensity at the magneticor measurement circuit by virtue of the size of the air gap at both of the probes 112', 112'', namely the Hall generators, are transformed into a "mean measurement value" with the aid of the amplifier 210 and the summation resistors 211, 212 and the feedback resistor 213. This mean or average measurement value is then delivered via a voltage divider composed of the resistor network 151, 153 to an input of a differential amplifier 155.

As will be readily apparent by reference to FIG. 2a, the circuitry of the measurement or measuring circuit M is constructed in practically the same manner. Just as was the case for the comparison circuit C, the power supply network alternating-current voltage is stepped-down with the aid of the transformers 301 and 302 and transformed via the rectifier circuit arrangements 303 and 304, 305 into the required DC voltages.

For the setting of the excitation current $i_{const}$, which assures a constant value in the measurement circuit M, for the magnetic field by means of the field coils 9a', 9b', and 9a'', 9b'', there is provided the adjustment or setting resistor 306. For the adjustment of the operating point of the Hall probes 110', 110'', similar to the comparison circuit C, there are also employed for the measurement circuit M the variable resistors 307, 308. Hence, the generated Hall voltages at the probes and with constant excitation current $i_{const}$ at the field windings 9a', 9b' and 9a'', 9b'', change as a function of the external air gap of the measurement circuit M, i.e., as a function of the roller gap L which is proportional to the measurement air gap.

Similar to the aforedescribed construction concerning the comparison circuit C, here also the Hall voltages of the measurement circuit M are delivered to a summation amplifier 310 equipped with the resistance networks 311, 312, 313 for the purpose of forming the mean or average value. The output voltage delivered by this amplifier 310 is supplied to the second input of the differential ampliffier 155 and the associated voltage divider 152, 154 arranged at the output side of amplifier 310. A suitable instrument 25, such as a galvanometer, connected with the output of the differential amplifier 155, indicates any change in the roller gap L as determined by the measurement circuit M in relation to the reference value selected for the comparison circuit C.

As should be readily apparent, the measuring technique is not altered even if the measurement voltage which is dependent upon the roller gap and delivered from the measurement circuit M with the aid of either one of the respective measuring arrangements of FIG. 1, is maintained constant and the corresponding Hall currents which are directly proportional to the roller gap are changed. Furthermore, it is basically also possible to compare the absolute measurement voltage which is dependent upon the roller gap L and delivered at the output of the amplifier 310 with a fixed voltage which has been generated in any other suitable manner and which possesses the same physical dependencies, such as temperature course, and non-linearity.

The construction of the comparison circuit C and measurement circuit M which is part of the electrical measurement arrangement depicted in the circuit diagram of FIG. 2a has been schematically illustrated in FIG. 2c. The construction essentially corresponds to the measurement apparatus portrayed at the right-hand side of the roller arrangement of FIG. 1. The magnetization devices for both these circuits C and M, consisting of the coils 9c', 9d', 9c'', 9d'' and 9a', 9b', 9a'', 9b'', may be cast in plastic as part of the measurement rings 3a'', 6a'' at the corresponding probe halves and thus fixed. Furthermore, in accordance with the basic measurement principle of this development, the Hall generators 112', 112'' and 110', 110'', which have been illustrated in the circuitry of FIG. 2a and which serve to measure the magnetic flux, are enclosed between two legs of a ferromagnetic iron body conducting the magnetic flux practically without resistance.

Consistent with the intended purpose of the comparison circuit C, namely to deliver a reference voltage for the roller gap L consistent with the intended purpose of the measurement circuit M to deliver a measurement voltage from the roller gap L, both of the corresponding probe halves of the comparison circuit are fixedly arranged (air gap is constant) and the probe halves of the measurement circuit are arranged to be movable towards one another (air gap is variable). Hence, at the comparison circuit C the air gap thereof is constant, as such has been portrayed for the left-hand arrangement of FIG. 2c wherein the air gap L = O, and the magnetic flux and the Hall voltages generated thereby are adjusted with the aid of a variable excitation current of the field coils $9c'$, $9d'$, $9c''$, $9d''$. On the other hand, at the measurement circuit M the air gap L, owing to the movement of the rollers 1 and 4 is, of course, variable so that with the excitation current $i_{const}$ at the field windings $9a'$, $9b'$, $9a''$, $9b''$ maintained exactly constant, the change in the Hall voltages is dependent upon the change in the size of the roller gap L.

It is here further mentioned that for the exact measurement of the roller gap L, both of the magnetic circuits $9'$, $9''$ (see FIG. 2c) are designed to be exactly mechanically and electrically symmetrical, both as concerns the coil arrangement $9a'$, $9b'$ and $9a''$, $9b''$ respectively, and also as concerns the arrangement of such coils with respect to both a plane containing the connection line 20 (see FIG. 4) between the centers of the rollers 1 and 4 and the plane containing the center line y—y through the air gap L, and which center line is offset 90° with respect to this connection line 20. Due to this symmetrical construction of the magnetic circuits $9'$ and $9''$, there is first of all measured the exact "mean or average" roller gap and secondly there is realized an extensive compensation of the magnetic stray fields at the region of the measurement air gap which would otherwise impair the measurement results.

Figure 2B:
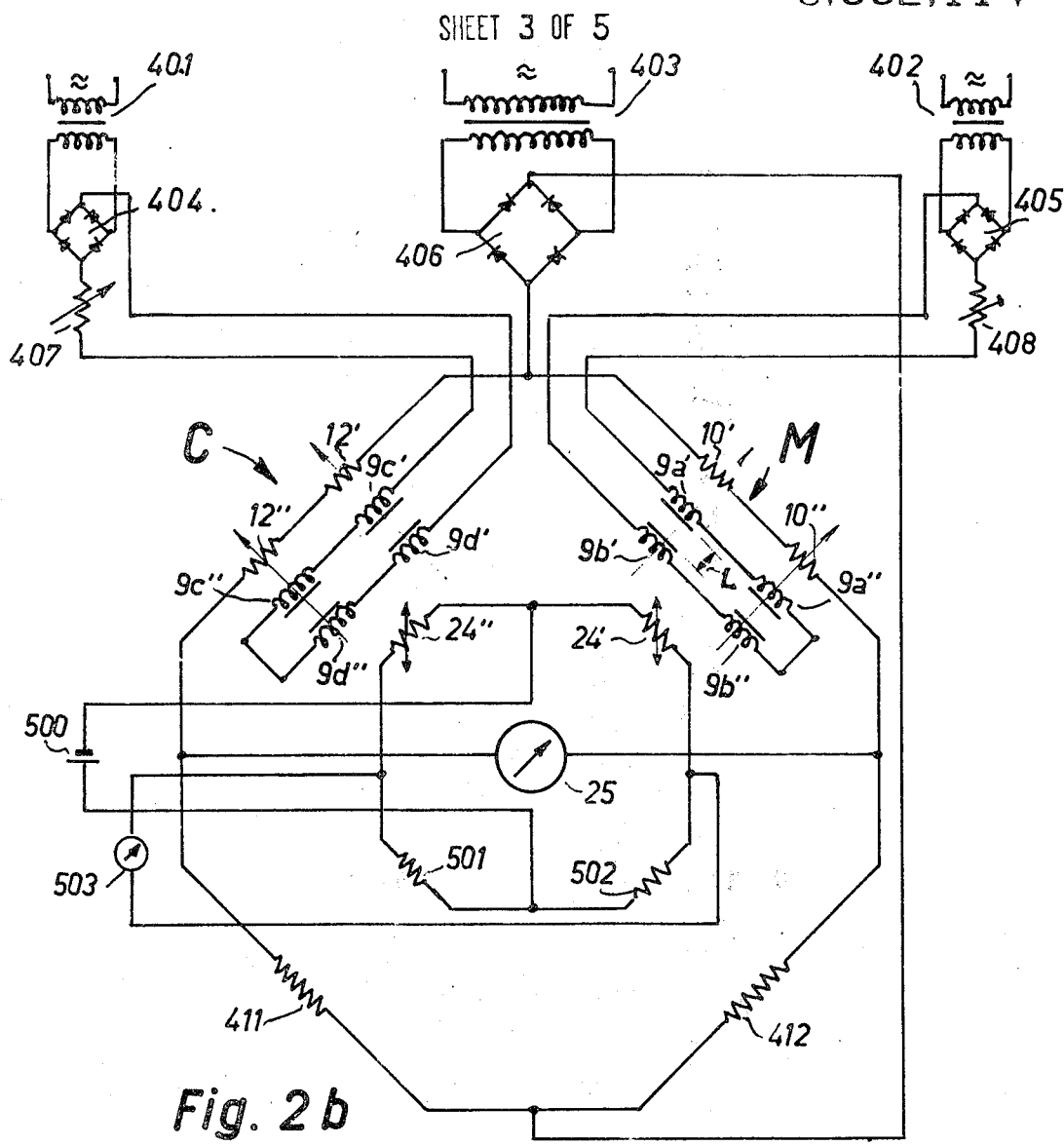
FIG. 2b is a circuit diagram of a modified form of measuring apparatus employing field-responsive plates for measuring the distance between the rollers of the arrangement of FIG. 1.
Figure 2D:
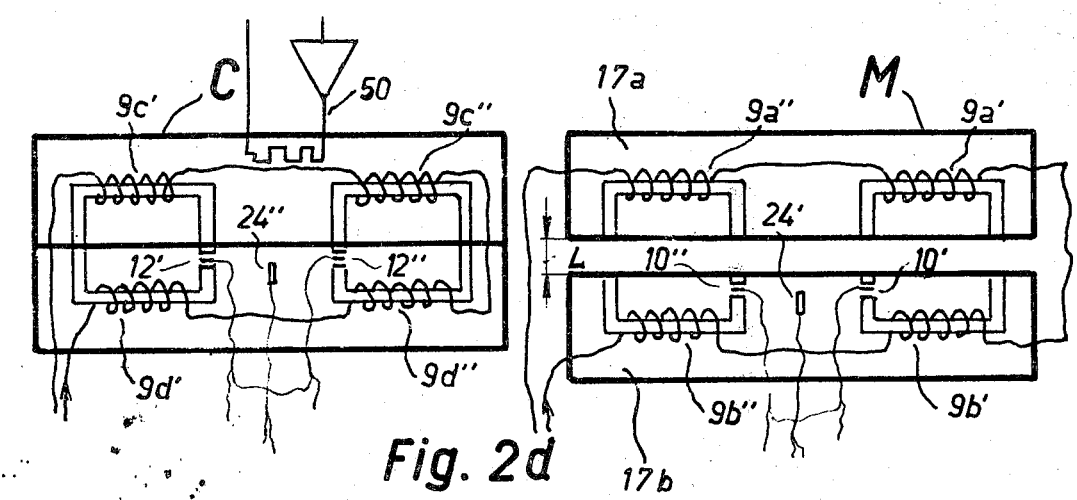
FIG. 2d portrays details of the circuit arrangement of FIG. 2b.

The circuitry depicted in FIG. 2b with the associated mechanical arrangement as portrayed in FIG. 2d is designed in much the same manner as the circuitry of FIG. 2a and the associated mechanical or spatial arrangement of FIG. 2c. Here, in contrast to the active Hall generators and the amplifiers which were employed for the circuit configuration of FIG. 2a, the circuitry of FIG. 2b employs passive components, and specifically the field responsive plates (magnetic field-responsive resistors) $10'$, $10''$ and $12'$, $12''$. Just as was previously the case, also with this arrangement two voltages emanating from the comparison circuit C and measurement circuit M respectively, are compared with one another, and according to the embodiment under disussion and in a very simple manner, in a conventional bridge circuit arrangement. Once again, the supply voltage for the bridge circuit is delivered via a transformer 403 from a power supply network through the agency of the subsequently connected fullwave rectifier circuit 406. The excitation current for the field coils $9c'$, $9d'$, and $9c''$, $9d''$ for magnetization of the comparison circuit C is supplied by the transformer 401 and the rectifier circuit arrangement 404. The excitation current for the coils $9a'$, $9b'$ and $9a''$, $9b''$ for magnetization of the measurement circuit M is supplied by the transformer 402 and the rectifier circuit arrangement 405. Similar to the previously discussed embodiment, here also the setting of the desired reference voltage for the roller gap at the comparison circuit can be undetaken with the aid of the variable resistor 407 which may be conveniently calibrated in displacement increments or units, and the fixed adjustment of the constant excitation current for the measurement circuit M can be carried out with the aid of the variable resistor 408. With the circuitry portrayed in FIG. 2b, the half-wave rectifier bridge branch or arm formed by the field plates $12'$, $12''$ for the comparison circuit C and by the field plates $10'$, $10''$ for the measurement circuit M are supplemented by the ohmic resistors 411, 412, to thereby form a full-wave bridge circuit arrangement. A suitable instrument 25, such as the previously mentioned galvanometer, is employed as an indicating device for indicating the difference between the current flowing through both bridge branches of the circuits C and M.

Apart from the measurement circuit of FIG. 2b for measuring the changes in the roller gap L and which circuit is equivalent to the circuit of FIG. 2a, there is also provided in this case an additional circuit for determining temperature differences between the comparison circuit C and the measurement circuit M. As best seen by referring to FIG. 2b, there are here provided temperature probes, for instance temperature-dependent resistors $24'$ and $24''$ which are electrically coupled with the measurement circuit M and the comparison circuit C respectively, and connected in circuit in conventional manner with the resistors 501, 502, so as to form a full-wave bridge circuit, and finally also connected into circuit with a supply voltage 500 and an indicating instrument 503, as shown. Hence, a differential voltage appearing at the output side of the rectifier bridge arrangement, in other words for instance indicated at the indicating instrument 503, can be employed to act upon, for instance, a suitable heating and cooling control circuit, such as generally indicated by reference character 50 for the comparison circuit C of FIG. 2d, to thereby bring about temperature compensation between the comparison circuit C and the measurement circuit M. It would of course be possible to arrange the heating and cooling control circuit 50 at the measurement circuit M, and in each case there would be undertaken appropriate compensation for any temperature fluctuations which might arise during operation of the system. A similar arrangement could obviously be provided for the circuitry of FIGS. 2a and 2c.

The mechanical and spatial construction of the circuitry depicted in FIG. 2b has been illustrated in FIG. 2d. The difference with this arrangement, in contrast to that of FIG. 2c, will be seen to reside in the fact that in this instance there is provided a "two conductor" circuit for the (passive) semi-conductor probes in contrast to the "four conductor" circuit of the (active) Hall probes of the embodiment discussed with respect to FIGS. 2a and 2c.

A further schematic illustration of the measuring principle of an arrangement for the measurement of the roller gap in accordance with the showing of FIG. 1, the specifically considering the left-hand side arrangement thereof, has been depicted in FIG. 2e. It will be recognized by referring to FIG. 2e that the magnetic flux 11 at the right-hand illustrated measurement circuit M can be directly introduced into the measurement of carrier rings $3a'$, $6a'$ with the aid of a magnetization device here consisting of the iron circuit 8, $8'$, $8''$, component 8 constituting an armature and components $8'$ and $8''$ pole pieces, the excitation coil 9 for the excitation current, and wherein the magnetic flux 11 can be conducted back to the point of origin through the test probes $10'$, $10''$. In similar manner, the magnetic flux 14 generated at the iron yoke 15 with the aid of the coil 16 and the excitation current i at the comparison circuit C located at the left-hand side of FIG. 2e, is conducted through the reference probes $12'$, $12''$. The semi-conductor probes 10', 10" and 12', 12", which have been simply depicted by way of example in this embodiment of FIG. 2e as field plates (magnetic field-dependent resistors), but obviously could be constituted by other field responsive probes, such as the previously disclosed Hall generators, are electrically coupled together in similar manner as in the circuit arrangement of FIG. 2b, into a conventional rectifier bridge arrangement 13. A difference in the resistances of the probes and the branch circuits in the bridge circuit arrangement, during a change in the size of the roller gap L, produces a deflection at the indicating instrument 25.

The two test probes 10' and 10" act differentially with regard to the axis of symmetry x—x in such a way that a small lateral displacement $\Delta x$ in a plane perpendicular to the common axial plane of the rolls 1 and 4 remains practically without influence upon the precision of the measurements taken. The flux 11 of the magnetic field traverses the probes 10' and 10" in an asymmetrical manner with respect to the axis x—x, the flux emanating from the armature 8 excited by the field winding 9 with a constant current. The shape of the pole pieces 8' and 8" of the armature 8 conforms closely to the contour of the rings 3a' and 6a' so as to reduce to a minimum the air gap between them. Since the magnetic reluctance of the path between the elements 3a', 6a', 8' and 8" and through the air gaps between them is negligible, the magnetic flux produced by the constant excitation current in the winding 9 can be regarded with sufficient precision as a function of the distance L between the rolls 1 and 4. As above indicated, with this arrangement the roller gap L to be measured between the rolls 1 and 4 can be determined by balancing the bridge circuit, which is brought about by varying the current $i$ and the indicating instrument for this current may be directly calibrated for the measurement of such length.

Figure 3:
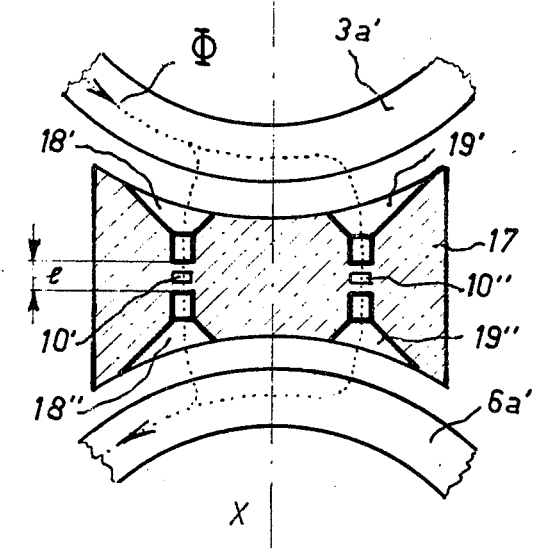
FIG. 3 illustrates an embodiment of a probe carrier used in the measurement apparatus according to the invention, and specifically for instance as appears at the left-hand side of the rolling mill depicted in the arrangement of FIG. 1.

In FIG. 3, there has been illustrated the details of a possible form of carrier 17 of the type arranged at the left-hand side of the measuring arrangement of FIG. 1. In order to achieve optimum field distribution over preselected range of adjustment between maximum and minimum values of the roller gap L, the probes 10' and 10" may each be embedded, for instance, between cylindrical poles or pole pieces 18', 18" and 19', 19" respectively, and these pole pieces or poles may have the shape of cones or pyramids and the poles of one pair of spaced from each other by the distance λ. The cones flair outwardly towards the air gap between the rolls 1 and 4. The probes 10' and 10" and the poles or pole pieces are supported in the single carrier 17 formed of magnetically non-conductive material and these probes are arranged such with respect to one another and to the axis x—x that they are symmetrical with respect to and equidistant from such axis. As intended to be portrayed by the broken lines, the magnetic flux $\phi$ is conducted through the measurement rings 3a' and 6a' and through the poles 18', 18", and 19', 19" formed of ferromagnetic material and which are fixedly embedded in the carrier 17 and magnetically insulated from one another and also flows through the therein embedded semi-conductor probes 10', 10". The magnetic resistance of the magnetic circuit, with negligible resistance of the iron components, is determined by the (constant) probe air gap λ and by the "outer" work air gap between the carrier 17 (and the therein embedded poles) and the measurement rings 3a' and 6a' situated opposite thereto. For purposes of obtaining an advantageous matching of the characteristics of the probe- and magnetic circuit to one another the poles which conduct the magnetic flux to the probes are, as mentioned above, advantageously designed to possess a pyramidal or conical configuration.

Figure 4:
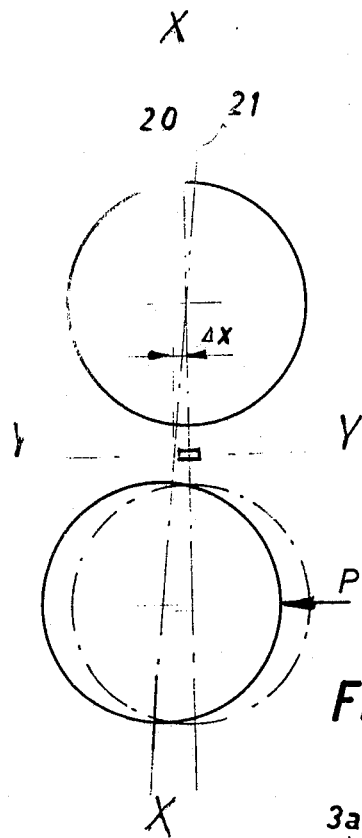
FIG. 4 diagrammatically illustrates two laterally offset rotating rolls or roller bodies, the distance of which is to be measured, and given for the purpose of explaining the error effects to which a measuring element may be subjected to during practical operation of the rolling mill.

FIG. 4 has been provided for the purpose of schematically illustrating the error effects to which an individual measuring element retained between the rollers is subjected to during practical operation of a rolling mill. As schematically depicted, owing to the play of the rolls in their bearings and at the roller frame, the rollers are spatially displaced relative to one another and accordingly change the roller gap as a function of the degree of such shifting or displacement. This displacement occurs in the axis of symmetry y—y under the influence of an outside force P. This displacement may be either static or alternates in opposite directions along the axis y—y and can become so great that the probes, such as the probes 10' and 10", are no longer able to compensate the resulting error with sufficient precision. Hence, the point of attack of a tangential load causes displacements of the roller connection line 20 into the position 21 and a lateral shifting, that is to say, an error in the measurement apparatus by an amount $\Delta x$. It is therefore desirable to provide means for positively guiding the probe carrier 17 of FIG. 3, so that the probes remain in a symmetrical position relative to the axis x—x and to the line containing the measured distance or roller gap L. Hence, for the purpose of compensating the error in the roller gap measuring apparatus, as the same has been discussed above in conjunction with FIG. 4, and apart from the means for forming a mean value as discussed above in conjunction with FIGS. 2a to 2e and FIG. 3, there is provided a specially constructed holding deive for the carrier 17, also referred to as a self-centering means.

Figure 5:
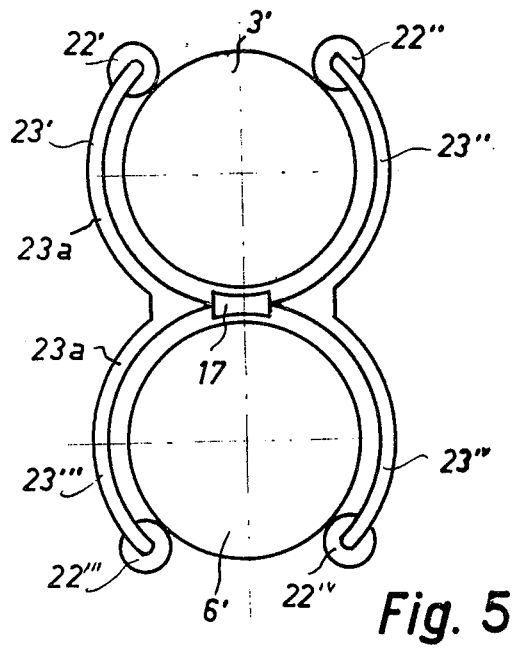
FIG. 5 illustrates details of an embodiment of self-centering apparatus for use with the measuring apparatus of the invention.

Now FIG. 5 illustrates details of such holding device which is provided for this purpose and which, within wide limits, i.e., at least over the entire range of roll adjustment, fixes the position of the probe carrier 17 so that the latter always remains symmetrical with respect to the axis x—x and is also exactly located halfway between the ends of the distance to be measured. Thus, the measurements taken by the probes in the carrier 17 are not influenced by the displacement $\Delta x$ of one or both of the rolls 1 and 4 caused by external forces or loads. This holding device comprises a member having to pairs of two-pronged forks 23a, the prongs 23' and 23" of one fork 23a embracing the guide sleeve 3' of the upper roll 1 and the prongs 23'" and 23"" embracing the guide sleeve 6' of the lower roll 4. The ends of the prongs each carry rollers 22', 22" and 22'", 22"" which engage in pairs at the guide sleeves 3' and 6' of the rolls 1 and 4 respectively, and are freely movable at such guide sleeves. In this way the position of the carrier 17 at the connection line 20 of FIG. 4 for both rollers 1 and 4 is exactly fixed and independent of the position of the rollers with respect to one another and with respect to the frame of the rolling mill. Thus, with the prongs and the rollers in the position shown in FIG. 5, the carrier 17 always assumes a position in which it is symmetrical with regard to the axis x—x independently of any external forces.

The self-centering or holding device depicted in FIG. 5 for the carrier 17 at the left-hand end of the arrangement of FIG. 1 and disposed between the rollers is not limited solely to the carrier 17, rather also, and while taking into account constructional requirements, is equally applicable for the carrier halves of the measurement rings 3a''', 6a'' at the right-hand side of the arrangement of FIG. 1 as well as for the exemplary embodiments of the carrier halves depicted in FIGS. 2c and 2d at the right side thereof.

Figure 6:
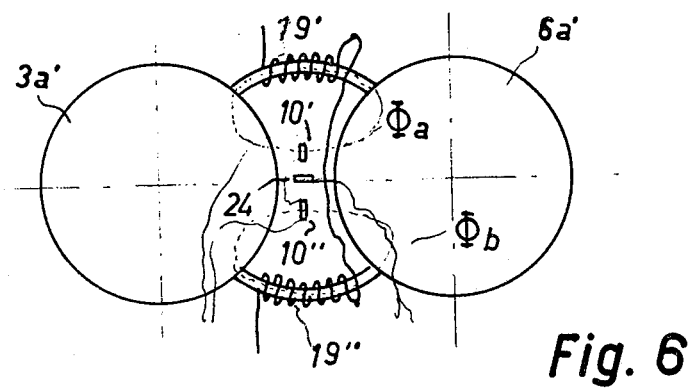
FIG. 6 illustrates the arrangement of a temperature probe in the measuring field.

An improved variation of the measuring circuit depicted in FIG. 2e has been diagrammatically illustrated in FIG. 6. In this embodiment the field winding for the magnetic circuit is split-up into two symmetrical parts 19' and 19'', producing the magnetic fluxes $\phi_a$ and $\phi_b$ for the probes 10' and 10'' respectively. Furthermore, a temperature probe 24 is mounted into the carrier for the two probes and arranged between the latter as depicted in FIG. 6. The probe 24, and for instance corresponding to the temperature probe 24' of the circuit arrangement of FIG. 2b, has a resistance which depends upon the temperature of the carrier. Also, analogous to the circuit arrangement of FIG. 2b, the probe 24 is inserted as a resistance in one arm of a bridge circuit in juxtaposition to the other temperature probe, like the temperature probe 24'' of FIG. 2b, arranged at the comparison circuit. The difference difference the temperature between the two magnetic circuits is indicated by the bridge circuit arrangement and compensated by the heating or cooling control means previously discussed. FIG. 6 depicts a double-sided symmetricaly infeed of the magnetic flux, divided into the fluxes $\phi_a$ and $\phi_b$, into the rings 3a', and 6a' with the aid of the field coils 19' and 19''. As also previously discussed, the magnetic flux is conducted via the iron yoke of the field coils 19' and 19'' to the ferromagnetic rings 3a', 6a' and from that location via the poles and the semi-conductor probes back again to the point of origin.

Figure 7:
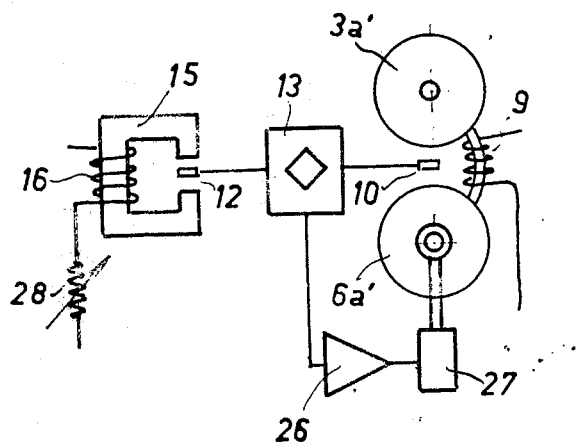
FIG. 7 is a diagrammatic illustration of a control circuit for use with the method according to the invention.

FIG. 7 discloses a roller gap measuring device wherein the differential signal, indicated by the instrument 25 of, for instance, FIGS. 2a, 2b and 2e and appearing at the output of the circuit, is employed for the regulation or control of the spacing of the rollers 1 and 4 and therefore the roller gap L. In accordance with the circuits of FIGS. 2a and 2b in the arrangement of FIG. 7 the comparison circuit is formed by the iron yoke 15, the excitation coil 16, the adjustment resistor 28 and the probe 12. The measurement circuit of the rolling mill consists of the measurement rings 3a', 6a', the magnetizing device 9 and the probe 10. The magnetic field-dependent Hall voltages or resistance values respectively, as the case may be, and furnished by the probes, are delivered to the difference-forming measuring device as previously discussed, for instance in this case the differential amplifier for a bridge circuit, as generally indicated by reference character 13. The voltage appearing at the output of the difference-forming measuring deivce 13 is further delivered to a power amplifier 26 and an adjustment or setting element 27 connected therewith and which mechanically engages with the rollers. The adjustment element 27, which may be a servomotor or any other suitable adjustment device, and which cooperates in the correct phase position with the roller setting accordingly insures that the spacing of the lengthwise axes of the rollers, in other words the roller gap L which is formed by the roller 1 which is fixedly mounted at the frame and the roller 4 movably connected with the adjustment element 27, can be maintained exactly constant by means of the potentiometer or variable resistor 28 at the pre-selected value independent of load fluctuations and other disturbing influences.

Figure 8:
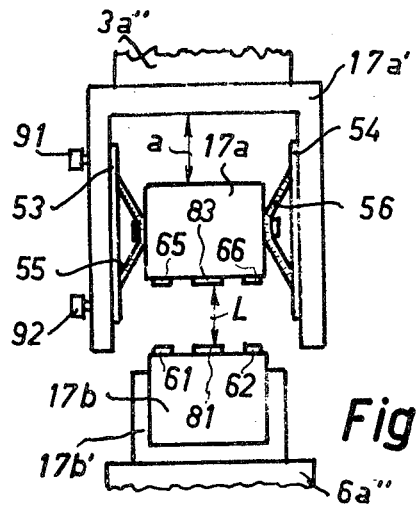
FIG. 8 is a schematic view of a further embodiment of apparatus of this development.

In FIG. 8 there has been depicted in cross-sectional view the probe halves which have been illustrated as part of the measuring arrangement of FIG. 1 as well as according to the showing of FIGS. 2c and 2d. As will be apparent from the perspective view of FIG. 1, and specifically looking at the right-hand side thereof, the measuring or carrier rings 3a'' and 6a'' are mounted at the roller bodies or rollers 1 and 4 and specifically at the region of the journals 2'' and 5'' respectively, and therefore fixed with respect to the respective lengthwise axis of the corresponding roll. Since in practice the roller portions 1'' and 4'' of the rolls 1 and 4 respectively, must be continuously reground owing to the wear which occurs during the rolling operation of the sheet stock, after the alteration or exchange of each roller there is altered the relationship of the spacing of the lengthwise axes of the rolls with respect to the roller gap L. Now for the purpose of compensating the roller wear, there is movably secured to a respective associated measurement or measuring ring such as the ring 3a'', for the measurement of the roller gap according to the arrangement of FIG. 1, one of both probe halves 17a, 17b of the probes, such as the probe half 17a, and which correspond to one another. Owing to the rather inaccessible spatial orientation of the measurement device at the roller gap of the rolling mill, the mechanical readjustment device for compensating for the roller wear, that is, calibration of the measurement arrangement, must take place without the need to carry out any manual manipulations. Hence, the arrangement of the measuring device depicted schematically in FIG. 8 constitutes an advantageous solution suitable for this purpose, and wherein the upper probe 17a is displaceably fixed in a housing or trough 17a' of the associated carrier ring 3a'' with the aid of springs 55, 56 in connection with the friction elements 53, 54 and their pressure screws 91, 92. The displacement of the upper probe 17a is in the direction of the stationary probe 17b which is mounted in the housing or trough 17b' of its associated carrier ring 6a'' which has only been partially shown in FIG. 8. The exact calibration of the measuring arrangement occurs with the aid of such device in a most simple manner, and specifically the probe 17a secured in the housing or trough 17a', prior to assembly at the rolling mill, is initially adjusted so as to possess the largest possible spacing a, as best seen by referring to FIG. 8. After the assembly of the measuring rings 3a'' and 6a'' at the necks of the rolls 1 and 4 and upon placing the rolling mill into operation, the rolls 1 and 4 are initially completely displaced towards one another with a contact pressure and roller flattening accommodated to the operating conditions of the rolling mill, and such that the roll gap assumes the value null. During this operation, i.e., during closing of the roll gap, the poles 83 (only one of which is visible in FIG. 8, the other being at the opposite end of the probe 17a similar to the arrangement of the poles 81 and 82 of the probe half 17b of FIG. 10) and the spacer element 65, 66 at each end of the probe half 17a, and which spacer elements are disposed in the same plane or flush with the poles 83, as shown, move into contact with and against the corresponding components, namely the poles 81, 82 and the spacer elements 61, 62 and 63, 64

(FIG. 10) of the stationary probe half 17b and consequently during this calibration operation the displaceable probe 17a is displaced back into the trough or housing 17a' when assuming this aforementioned contacting position and with the roller gap set to null. After opening of the rolls 1 and 4 the displaceable probe 17a remains in the adjusted position which is then fixed by the friction devices 53, 54, 55 and 56 and if desired the pressure screws 91, 92, until the next calibration operation following a renewed change or regrinding of the rolls. In this way there is insured that even when the rolls 1, 4 assume a position where they contact one another and with the required roller flattening pressure expected to be encountered during the rolling operation, the probes 17a and 17b will not damagingly contact with one another but only, at most, slightly contactingly bear against one another.

Figure 9A:
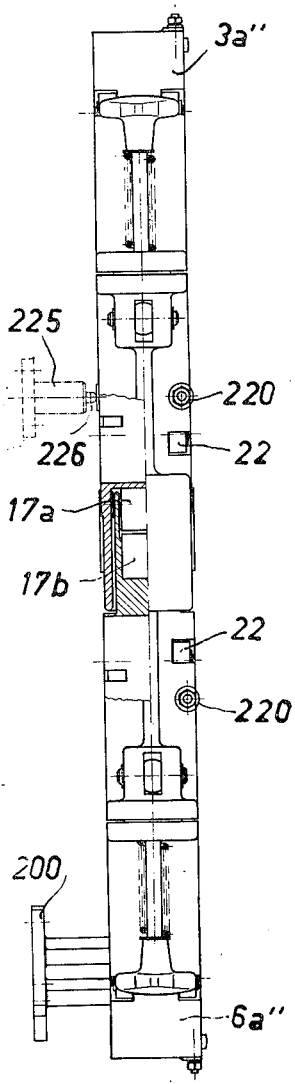
FIG. 9a is a side view of the arrangement of FIG. 9.
Figure 9:
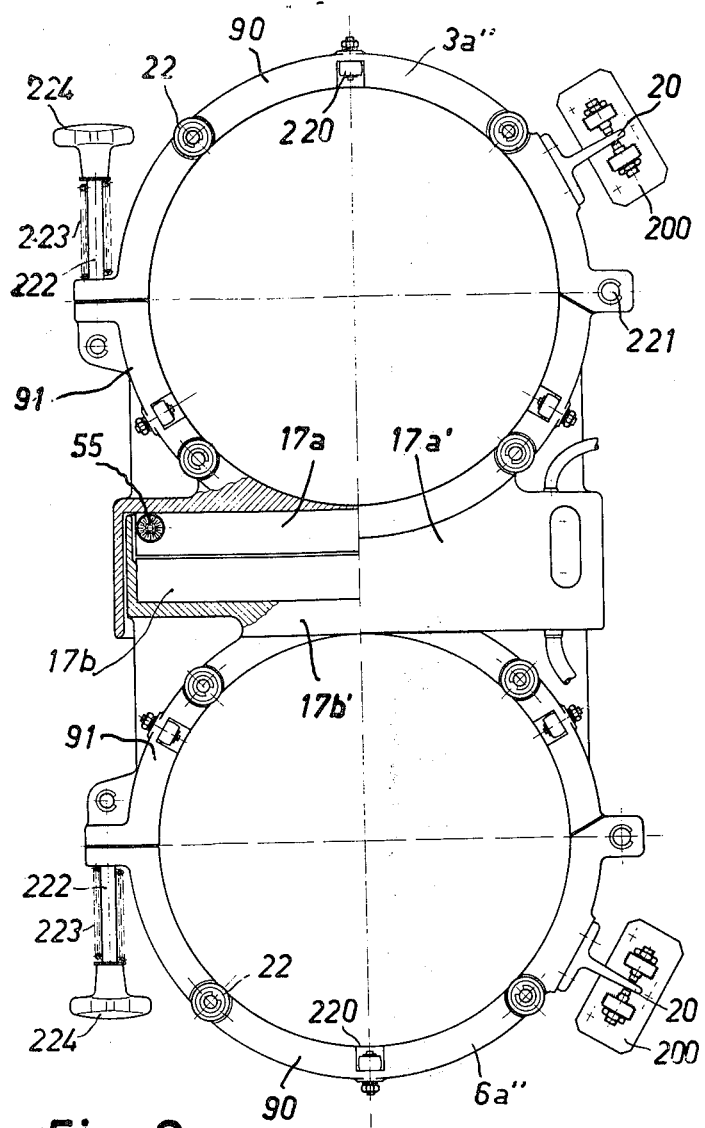
FIG. 9 is a front view depicting details of the mounting means in the form of mounting rings for mounting the test probe or probes at the rollers.

A practical exemplary embodiment of a measuring arrangement of the type shown at the right-hand side of FIG. 1, in conjunction with circuitry of the type depicted in FIGS. 2a or 2b and the mechanical arrangement of FIGS. 2c and 2d respectively as well as the mounting principle depicted in FIG. 5 and the calibration arrangement depicted in FIG. 8, has been shown by way of example in FIG. 9 and the associated side view of 9a. As already explained heretofore, the upper displaceable probe half 17a which is suspended by plate springs 55, 56, displaceably at the associated trough or bell-shaped housing 17a' is mounted with the aid of the measuring or measurement ring 3a'' and its radial bearings 22 and axial bearings 220 at the guide sleeve 3'' (FIG. 1) of the roll 1 which, for purposes of clarity in illustration, have not been particularly shown in this Figure. The means for securing the measuring ring 3a'' against rotation in this case consists of the substantially T-shaped element 20 and the bifurcated or forked member 200 which is secured at the mounting block 2a'' (FIG. 1) and such securing means serves to fixedly retain the measuring ring 3a'' in position with regard to the frame 7 of the rolling mill.

In order to achieve a simpler assembly or mounting and for compensating for the play of the bearings, the measuring ring 3a'' is advantageouly fabricated from two ring halves 90, 91, which can be opened and fixedly enclose without play the guide sleeve 3' of the roll 1 by means of a hinge bolt 221, the clamping screw 222, the spring 223, and the nut member or threaded spindle 224. As will be readily apparent by referring to FIG. 9, a similar construction is also provided for the other measuring ring 6a'', The trough or substantially bell-shaped housing 17a' serves to mechanically protect the probe 17a against damage by faulty rolled band which is urged or pressed in the direction of the mounting element 2a'' and the measuring ring 3a''.

In FIG. 9a there are also depicted details of the measuring device according to FIG. 9 in side view. By referring to this Figure, there will be observed a contact mechanism which serves to compensate for axial play at the rollers and such contact mechanism comprises a resilient or spring bushing or sleeve 225 and the contact bolt 226.

As already alluded to above, the construction of the measuring ring 6a'' mounted at the lower roll 4 and specifically at the guide sleeve 6'' is practically the same as the above-discussed construction of the upper measuring or measurement ring 3a''. The main difference between both construction resides in the feature that the probe half 17b of the lower measuring ring 6a'' is fixedly mounted at its trough 17b' in contrast to the displaceable upper probe half.

Figure 10:
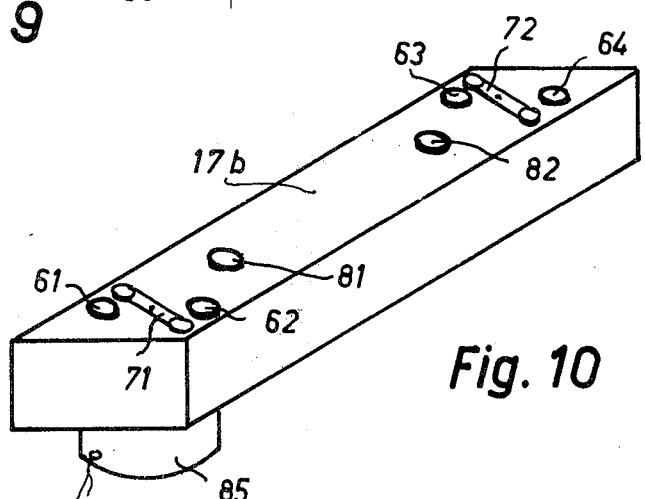
FIG. 10 is a perspective view of a detail of the measuring apparatus.

A variant of the adjustment and calibration mechanism has been shown in FIG. 10 for use with below average or so-called "negative" calibration of the roller gap, particularly when rolling thin stock or foils. Such adjustment of the roller gap for "negative" gap values is necessary if, for instance during the rolling of foils, the roller gap at the ends of the roller bodies 1'' and 4'' and the material thickness of the band is in the same order of magnitude as the flattening of the rollers. In other words, when rolling the foil, the thickness of the foil may be so small that the ends of the rolls 1 and 4 contact one another during the stock rolling operation so that the roller gap at such locations is in effect null. Hence, to avoid damage to the probes and for the proper calibration thereof, there is resorted to the use of the negative calibration device depicted in FIG. 10. This auxiliary calibration device, as shown in FIG. 10, employs, for instance, a rotary magnet 85 which electrically actuates the spacer or distance tonque members 71 and 72 so as to shift such into alignment with and over the associated spacer elements 61, 62 and 63, 64 respectively of the lower probe half 17b and such are retained in this position during the calibration operation and only during such time. After the calibration operation, which occurs in the manner previously explained, for the negative roller gap, the air gap between the probes 17a and 17b, and with the roller gap equal to null, is equal to the thickness of the spacer tongues 71 and 72 and thus even when rolling thin foils, is positive in any event. In other words, for the rolling of foils there is simulated by means of the spacer tongues a "positive" air gap of a size corresponding to the thickness of the spacer tongues so that even when the rolls 1 and 4 contact one another the probes 17a and 17b will be maintained in a spaced apart position.

While there is shown and described present preferred embodiments of the invention, it is to be distinctly understood that the invention is not limited thereto, but may be otherwise variously embodied and practiced within the scope of the following claims.

We claim:

1. A method of measuring the distance between cooperating rolls each having a roll neck of a rolling mill to thereby determine the size of the roller gap and the thickness of rolled sheet-like stock, comprising the steps of directly mounting a respective measuring probe at the roll neck of each of the cooperating rolls, fixedly mounting one of the measuring probes in a first housing on one of the roll necks and displaceably mounting the other of the measuring proves in a second housing on the other of the roll necks, introducing between both probes spacer elements during calibration of the probes for rolling foils, advancing the rolls towards one another and bringing such rolls into contact with one another with a predetermined contact pressure so as to produce a null roller gap, displacing the displaceable probe into its housing during contact of the rolls so that the displaceable and fixed probes bear against the space elements and upon contact with the spacer elements the displaceable probe assumes a defined reference position with respect to the fixed probe for the null roller gap, positionally fixing the displaceable probe, removing the spacer elements out of the operable region of the probes following the calibration operation, continuously measuring the changes in the spacing between the lengthwise axes of the cooperating rolls by means of the measuring probes, deriving from the measuring operation the distance between such cooperating rolls and in turn obtaining a measure of the thickness of the stock as it is rolled between such cooperating rolls at the rolling mill.

2. An apparatus for measuring the distance between cooperating rolls each having a roll neck of a rolling mill and thereby determining the thickness of processed sheet-like stock, comprising at least one pair of cooperating rolls forming therebetween a roller gap through which the stock is moved for rolling thereof, at least one test probe, mounting means mounted directly at a roll neck of the cooperating rolls for mounting said test probe between the roll necks, said mounting means comprising a substantially ring-shaped carrier support having a substantially bell-shaped housing portion for receiving the test probe, said substantially ring-shaped carrier support being composed of two parts which can be releasably clamped about the associated roll neck for detachably mounting thereat, means for generating a substantially uniform magnetic field which traverses said test probe, the density of said uniform magnetic field varying as the roller gap varies, said test probe monitoring the density variations of said uniform magnetic field in order to be able to determine changes in the distance between the lengthwise axes of the rolls.

3. The apparatus as defined in claim 2, wherein said mounting means includes means for automatically retaining the test probe so as to continuously assume a position substantially symmetrical with respect to a plane containing the lengthwise axes of said rolls.

4. The apparatus as defined in claim 3, further including at least one reference probe, both probes consisting of similar semi-conductors, the electrical conducitivity of which is sensitive to the density of magnetic fields traversing the probes, means for producing a substantially uniform magnetic field in respect of said reference probe, means for varying the density of the magnetic field traversing at least one of the probes and thereby the conductivity of the latter, and an electric bridge, the test probe and the reference probe each being arranged in juxtaposed branches of the bridge and the bridge can be balanced by changing the density of the magnetic field traversing one of the probes.

5. The apparatus as defined in claim 4, wherein said means for varying the density of the magnetic fields serves to vary the density of the magnetic field traversing the reference probe so that the bridge can be balanced by changing the density of the magnetic field traversing the reference probe.

6. The apparatus as defined in claim 2, wherein said mounting means comprise a carrier of non-magnetic material provided for the test probe.

7. The apparatus as defined in claim 4, further including magnetic pole pieces provided for the test probe to provide high density of the magnetic field traversing said semi-conductors.

8. The apparatus as defined in claim 7, further including a carrier of non-magnetic material provided for the test probe, and the magnetic pole pieces being supported at such carrier.

9. The apparatus as defined in claim 6, wherein said carrier is arranged at the roll necks at the region of the roller gap and provided with rollers contacting cylindrical surfaces of the rolls in such a manner as to hold the carrier against displacement relative to the rolls.

10. The apparatus as defined in claim 2, further including a second test probe and means for mounting said second test probe, said mounting means for said test probes comprising a respective carrier supported by the roll neck of the associated roll at the region of the roller gap to be monitored.

11. The apparatus as defined in claim 10, further including frictional means for displaceably resiliently mounting at least one of the test probes.

12. The apparatus as defined in claim 4, further including means for compensating for temperature differences between the circuit of the test probe and the circuit of the reference probe.

* * * * *